2,994,673
SYNTHETIC RESIN

Nicholas J. Capron, Chalfont, and Burton E. Lederman, Conshohocken, Pa., assignors to Pennsalt Chemicals Corporation, Philadelphia, Pa., a corporation of Pennsylvania
No Drawing. Filed Mar. 6, 1959, Ser. No. 797,584
18 Claims. (Cl. 260—18)

This invention relates to chemically curable resinous compositions prepared from epoxy ethers.

Epoxy ether resins, such as those prepared from the glycidyl ethers of bisphenols are widely used in the manufacture of varnishes, enamels, sealing liquids, casting and other molding compositions, cold solders, adhesives, impregnating compositions and the like. For these and other applications, the desired end products are obtained by reacting the epoxy ether in the uncured state with a so-called curing agent which converts the resin into a thermo-set or cross linked solid.

One of the most widely used classes of epoxy ether resins curing agents are the poly-functional aliphatic amines, particularly the polyethylene polyamines such as diethylene triamine, triethylene tetramine and tetraethylene pentamine. The polyamines have the advantage of providing rapid cures at ambient or relatively low temperatures to provide a cured resin having good chemical and physical properties. The polyamines, however, have a serious drawback, namely their high toxicity. Their toxicity is most commonly evidenced in the form of skin rashes and other forms of skin irritation suffered by the workers who come in contact with the liquid amine itself or its vapors. Since the amine curing agent must be formulated with the resin just prior to use in relatively small batches, the amines must necessarily be handled frequently, thus making it difficult to control the hazard. The polyamines have the further drawback in that they generally produce a cured resin that is undesirably brittle.

Another type of epoxy ether resin curing agents that are often used are polyamides derived by reacting long chain polymeric carboxylic acids with a polyamine such that the polyamide product contains free amine and/or free carboxyl groups. Such curing agents are prized chiefly because of their relatively low toxicity (they cause little or no skin irritation) and because of the flexible (that is non-brittle) characteristics of the resin cured with these agents. These polyamide curing agents, however, have disadvantages which sharply limit the scope of their use. One of their main disadvantages is that they impart a high viscosity to the resin curing agent system, and for this reason it is impossible or difficult to use them in solventless systems which are generally employed for casting, molding and similar applications. For structural applications (i.e. casting, molding and encapsulation etc.) they have the further disadvantage that the cured resin has relatively poor heat distortion and hardness properties as compared, for example, to aliphatic polyamine curing agents. These polyamide curing agents also have relatively poorer chemical resistance, particularly with respect to organic solvents and acids, than is usually obtained with the aliphatic polyamines.

It has now been found, in accordance with the present invention that mixtures of such polyamides with certain tertiary monohydroxy amino alcohols provide epoxy ether resin curing agents of outstanding advantages.

The curing agent mixtures of the invention retain the highly important advantage of low toxicity characteristic of the polyamides while overcoming their accompanying disadvantages. The use of the tertiary monohydroxy amino alcohol in conjunction with the polyamide effects a remarkable, many-fold decrease in the initial viscosity of the resin-curing agent system, while at the same time effecting a remarkable improvement in the physical properties and chemical resistance properties of the cured resins which is apparently due to a synergistic action since neither the tertiary monohydroxy amino alcohol nor the polyamides used alone are capable of providing properties approaching those of the combination. In structural applications, this synergism is particularly remarkable with respect to the improvement in heat distortion temperature, an important characteristic in such applications. There is likewise a marked increase in hardness, surprisingly without loss of impact strength (related to flexibility).

The tertiary monohydroxy amino alcohols which provide the above advantages include compounds having the general formula

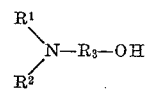

where $R^1$ and $R^2$ are methyl or ethyl radicals and may be the same or different; and where $R^3$ is an alkylene radical having 2 or 3 carbon atoms. Preferred compounds of the above class from the standpoint of effectiveness, cost and availability are dimethylaminoethanol $(CH_3)_2N-CH_2CH_2OH$ and diethylaminoethanol $$(C_2H_5)_2N-CH_2CH_2OH$$

Dimethylaminoethanol gives particularly excellent results. Other specific compounds falling in the above class include, for example, ethylmethylaminoethanol

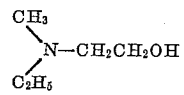

dimethylaminoisopropanol $(CH_3)_2-N-CH_2CHOHCH_3$, and dimethylamino-n-propanol $$(CH_3)_2-N-CH_2CH_2CH_2OH$$

If desired, mixtures of the above compounds, with themselves, may be employed, such mixtures in turn being mixed with the polyamide component to provide the curing agent of the invention. For example, mixtures of dimethylaminoethanol and diethylaminoethanol may be used, such mixture being further admixed with the polyamide component to provide, for example, a mixture containing 20% by weight of dimethylaminoethanol, 10% by weight of diethylaminoethanol and 70% of the polyamide component.

The polyamide component of the curing agent of the invention comprises thermoplastic resinous materials cntaining free amine groups, free carboxyl groups, or both, obtained by condensation of polymeric fat acids with an aliphatic polyamine. Polyamide resins of this type are well known per se and the preparation of these types of resins and their use as curing agents for epoxy ether resins is described in detail in U.S. Patents 2,379,413, 2,450,940, 2,705,223, 2,823,189, 2,839,549 and 2,844,552.

As described in these patents, the polymeric fat acids employed for preparing these polyamide resins are those obtained by condensing fat acids (in their free form or as esters), which contain two or more double bonds such as linoleic acid, linolenic or eleostearic, condensation taking place at the double bonds to form predominantly dimeric acids with smaller quantities of trimeric and higher polymeric acids containing at least two carboxyl groups per molecule. Suitable natural sources of such polymeric fat acids include drying or semi-drying oils such as linseed, soybean, safflower, tung, cottonseed, corn, tall, sunflower, perilla, oiticica oil and the like. The polymerization is carried out by thermal treatment with or without catalysts.

The polymeric fat acid is reacted with a suitable aliphatic amine to produce the polyamide, typical palyamines including e.g. ethylene diamine, diethylene triamine, triethylene tetraamine, tetraethylene pentaamine, 1,4-diamino butane, 1,3-diamino butane, hexamethylene diamine, 3-(N-isopropylamino) propyl amine, 3,3'-iminobispropylamine etc. In general the higher the number of amino groups in the polyamine molecule the higher will be the amine number of the polyamide.

The proportions of the polyamine and the polymeric fat acids are selected so that the polyamide resin contains free amine groups and/or free carboxyl groups. Preferred resins are those containing free amine groups since these are more effective in promoting low temperature curing of the epoxy ether resin. Preferred polyamides are those having molecular weights in the range of about 800 to 10,000 and having amine numbers in the range of from about 50 to 400. Amine number is defined as the number of milligrams of potassium hydroxide equivalent to free amine groups present in one gram of the resin. It is likewise preferred that the polyamide resin be a liquid at normal temperatures, although resins melting above normal temperature e.g. up to about 100° C. may be employed.

Epoxy ethers suitable for use in the compositions of the invention comprise those having a 1,2-epoxy equivalency greater than 1. By epoxy equivalency is meant the average number of 1,2-epoxy groups

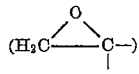

per molecule of the ether. Such ethers will cure when mixed with the curing agents of the invention to produce cross-linked, thermoset solids of high molecular weight. Where one specific epoxy ether is involved in contrast to a mixture of ethers, the epoxy equivalency will be a whole integer. Thus, the epoxy equivalency of a specific compound such as the diglycidyl ether of bis(4-hydroxyphenyl)-2,2-propane is two while that of the triglycidyl ether of a glycerol is three. Inasmuch as commercial epoxy ethers are usually complex mixtures of a number of specific ethers of different molecular weights the epoxy equivalency is necessarily in such cases an average value, and is unlikely to be an integer. An epoxy equivalency of 1.32 for example means that there are an average of 1.32 epoxy groups per molecule of the epoxy ethers present in the mixture.

The epoxy equivalency is determined by dividing the measured average molecular weight by the epoxide equivalent weight. The "epoxide equivalent weight" is the weight of the epoxy ether which contains one equivalent weight of a 1,2-epoxy group. It is determined by reacting a known quantity of the epoxy ether with a known quantity of hydrochloric acid and back-titrating the remaining acid to determine its consumption. The usual procedure is to heat a weighed sample of the epoxy ether with an excess of 0.2 N pyridinium chloride in chloroform solution at the boiling point under reflux for two hours whereby the pyridinium chloride quantitatively hydrochlorinates the epoxy groups to chlorhydrin groups. After cooling, the excess pyridinium chloride is back-titrated with 0.1 N sodium hydroxide in methanol to the phenolphthalein end point. The epoxide equivalent weight is calculated by considering that each molecule of consumed HCl from the pyridinium chloride combines with an epoxy group.

Suitable epoxy ethers include for example monoethers such as diglycidyl ether or di(2-methylglycidyl) ether but more preferably polyethers such as the 1,2-epoxy-containing polyethers of polyhydric alcohols (i.e., alcohols containing at least two alcoholic OH groups) or of polyhydric phenols. Suitable polyethers of polyhydric alcohols include the polyglycidyl polyethers of ethylene glycol, propyene glycol, diethyene glyco, triethylene glycol, trimethylene glycol, butylene glycol, dipropyene glycol, glycerol, diglycerol, erythritol, pentagycerol, pentaerythritol, mannitol, sorbitol, polyallyl alcohol, polyvinyl alcohol, inositol, p-xylylene glycol. These polyglycidyl polyethers may be prepared according to well known methods, such as by reacting the polyhydric alcohol with epichlorhydrin in the presence of .1% to 5% by weight of an acid acting compound, such as boron trifluoride, hydrofluoric acid or stannic chloride to form the chlorhydrin ether. The reaction is effected at about 50° C. to 125° C. using the reactants in such proportions that there is one mol of epichlorhydrin for every equivalent of hydroxyl group in the polyhydric alcohol. The chlorhydrin ether is then dehydrochlorinated by heating at about 50° C. to 125° C. with a small stoichiometrical excess (e.g. 10%) of a base such as sodium aluminate.

Suitable polyethers of polyhydric phenols include for example the polyglycidyl polyethers of dihydric phenols including mononuclear phenols such as resorcinol, catechol, hydroquinone and methyl resorcinol and polynuclear phenols such as 4,4' dihydroxy benzophenone, 1,5 dihydroxy naphthalene and particularly the alkylene bisphenols such as 2,2-bis(4-hydroxyphenyl) propane, 1,1-bis(4 hydroxyphenyl)propane, 1,1-bis(4 hydroxyphenyl) ethane, 1,1-bis (4-hydroxyphenyl) isobutane, 2,2-bis(4 hydroxyphenyl) butane, 2,2-bis(4 hydroxy-2-methylphenyl) propane, 1,1-bis(4-hydroxyphenyl)-2-methyl propane, 3,3-bis(4 hydroxyphenyl) pentane, 1,1-bis(4 hydroxyphenyl) 2-ethyl hexane, and bis(4 hydroxyphenyl) methane.

The glycidyl ethers of the polyhydric phenols may be prepared according to well known methods. For example the glycidyl ethers of the dihydric phenols may be prepared by reacting the dihydric phenol with epichlorhydrin at 50° C. to 150° C. using a molar excess of the epichlorhydrin in the presence of a base such as KOH, NaOH, Ca(OH)$_2$, the base being usually employed in slight stoichiometric excess of the epichlorhydrin. The usually complex mixture of products from such reaction may be generally represented by the formula:

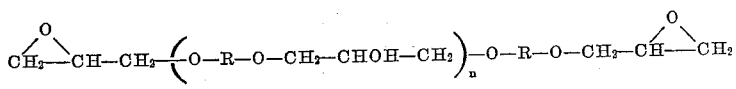

where R represents a divalent hydrocarbon radical of the dihydric phenol and where $n$ is an integer of the series 0, 1, 2, 3, etc. The average length of the chain enclosed in the parenthesis can be varied by changing the molar ratio of epichlorhydrin to dihydric phenol. Generally as the molar ratio of epichlorhydrin to dihydric phenol is decreased from 2:1 toward 1:1 the average value of $n$ increases, increasing the softening temperature of the resulting product.

Preferably, the epoxy ethers employed in the compositions of the invention contain only carbon, oxygen, hydrogen and halogen atoms. However, other epoxy ethers may also be employed if desired as the glycidyl ethers of polyhydric thio ethers such as 2,2'-dihydroxy diethyl sulfide, or the glycidyl ethers of thio alcohols such as alpha-monothioglycerol.

Particularly preferred in the practice of the present invention are the polyglycidyl polyethers of alkylene bisphenols, such as the commonly employed 2,2-bis(4-hydroxyphenyl) propane, having molecular weights ranging from about 350 to 9000 and epoxide equivalent weights ranging from 190 to 4500.

For the great majority of applications, the curing agent mixture should contain at least 5% and not more than 90% by weight of the tertiary monohydroxy amino alcohol, that is, the weight ratio of tertiary monohydroxy amino alcohol to the polyamide component should be in the range of from about 1:19 to 9:1. For structural applications, such as castings, moldings, pottings, and encapsulations and the like where relatively thick masses of resins are involved, the preferred weight ratio of tertiary monohydroxy amino alcohol to the polyamide component is from about 1:5 to 7:3. For coating applications, where the resin mass is a relatively thin section (generally less than 1/16 of an inch) the preferred weight ratio of tertiary monohydroxy amino alcohol to the polyamide component is of the order of 1:19 to 1:2.

Generally speaking, as the proportion of amino alcohol increases the less viscous the curing agent mixture becomes. It will be sometimes desirable to use a larger proportion of the amino alcohol to achieve a desired low viscosity. Higher proportions of amino alcohol also tend to hasten the cure, particularly in the case of dimethylaminoethanol, but at the same time tend to somewhat lower the chemical resistance and the physical properties. For this reason it is generally preferred to employ not more than about 50% by weight of the amino alcohol in the curing agent mixture.

The amount of curing agent to be employed in the resin-curing agent system will depend upon the particular resin used, the particular blend of curing agent employed, and to some extent upon the type of application, e.g. structural or coating, involved. As is well known in the art, the optimum amount of curing agent in any particular system is usually best determined by empirical methods. In the case of the polyglycidyl polyethers of the alkylene bisphenols, the proper amount of curing agent blend of the invention will generally be found to lie in the range of from 5 to 120 parts per-hundred by weight of the resin, and in most cases the optimum amount will lie in the range of from 8 to 70 parts per-hundred of the resin.

In structural applications the optimum concentration of the curing agent blend of the invention in the resin is considerably lower than the optimum concentration of the polyamide when used alone. To obtain good cures with the polyamide alone, usually from 40 to 120 parts of polyamide per-hundred parts of resin are employed. In the case of the curing agent blend of the invention, however, usually, from 8 to 16 parts of the blend per-hundred of resin will be found optimum for structural applications. In coating applications, where thin films of the resin are cured, somewhat higher concentrations of the blend, usually ranging from 30 to 60 parts of the blend per-hundred parts of resin will generally be found optimum.

The curing agents of the invention are particularly advantageous for use with epoxy ether resin systems which are employed for structural uses where relatively thick resin masses are to be cured such as in casting, molding, potting, encapsulation and the like. For such application epoxy ether resins which are liquids at ambient temperatures or temperatures slightly greater than ambient are preferred. Resins particularly suitable for this use are the polyglycidyl polyethers of dihydric phenols, especially polyglycidyl polyethers of alkylene bisphenols, having average molecular weights ranging from 350 to 800. Such resin systems may be employed with or without inert fillers which may be organic or inorganic, and may also have incorporated various dyes, pigments and the like.

As pointed out previously, it has not generally been practical to employ polyamide type curing agents in such systems because of the extremely high initial viscosity, e.g. 20,000 centipoises at 25° C., which the polyamide imparts to the system. At such viscosities, the resin, curing-agent system is difficult or impossible to cast or mold. The combination of the amino alcohol and the polyamide on the other hand produces a dramatic decrease in the viscosity, e.g. amounting to a 4 fold decrease or more, thus rendering the system amenable to casting and molding operations. The reduction in viscosity of the polyamide itself which occurs when the amino alcohol is added is likewise of importance. The viscosity of the polyamide alone may be e.g. 80,000 centipoises. By the addition of the amino alcohol this high initial viscosity may be reduced e.g. 100 fold to 800 centiposies. The lowering of the viscosity of the polyamide maks it easier to blend with the epoxy resin.

Another disadvantage encountered in the use of polyamides alone as curing agents in such systems is that certain important physical properties, particularly heat distortion temperatures and hardness are undesirably low as compared, for example, to the type of cures produced by the aliphatic polyamine curing agents. The curing agents of the invention overcome this disadvantage. Remarkably high heat distortion temperatures, particularly are obtained, substantially equivalent to those obtained with the highly toxic aliphatic polyamines. The synergism between the two components of the curing agents of the invention is particularly marked with regard to heat distortion values since neither component alone produces values approaching those of the combination. Using the curing agents of the invention, furthermore, markedly higher hardness values are obtained than with the use of the polyamide alone.

A still further disadvantage in the use of polyamides alone is the relatively poor chemical resistance particularly with respect to organic solvents and organic acids. The curing agents of the invention again display synergistic action in remarkably improving chemical resistance particularly in these respects.

The following examples illustrate the invention as applied to structural applications.

EXAMPLE I

An epoxy resin casting formulation, designated as Casting Formulations A, B and C were prepared as follows:

|  | Parts by weight | | |
| --- | --- | --- | --- |
|  | Formulation A | Formulation B | Formulation C |
| Epoxy Ether Resin A | 100 | 65 | 100 |
| Dimethylaminoethanol | 3 |  | 10 |
| Polyamide A | 7 | 35 |  |

Epoxy ether resin A is a liquid epoxy ether resin prepared by reacting 2,2-bis(4-hydroxyphenyl) propane with epichlorhydrin. It has an average molecular weight of about 375, a viscosity of about 16,000 centipoises, a specific gravity of 1.16 and an epoxy equivalency of about 1.8. It may be prepared, for example, according to the procedure described in U.S. Patent 2,643,239. "Polyamide A" is a resinous polyamide containing free amine groups obtained by the condensation of dimerized and trimerized unsaturated fatty acids (principally linoleic) from vegetable oils with triethylene tetramine to produce a resin liquid at normal temperatures having an amine value of about 310, a Gardner color NDT 12, a viscosity at 25° C. of 800 poises (Brookfield Viscometer) containing 0.05% by weight ash and having a specific gravity of 0.97.

*Table I*

|  | Casting Form A | Casting Form B | Casting Form C |
|---|---|---|---|
| Brookfield Viscosity (centipoises) | 5,600 | 20,000 | 1,200 |
| Heat Distortion Temp., °C | 110 | 80 | 82 |
| Acetone Immersion, Percent wt. increase: | | | |
| 1 day | 0.4 | 2.6 | 2.1 |
| 7 days | 1.4 | 5.8 | |
| 30 days | 4.0 | 14.0 | |
| Acetic Acid Immersion, Percent wt. increase: | | | |
| 1 day | 0.2 | 1.1 | |
| 7 days | 0.6 | 3.3 | |
| 30 days | 1.2 | 5.7 | |
| Water Immersion, Percent wt. increase: | | | |
| 1 day | 0.2 | 0.2 | 1.9 |
| 7 days | 0.4 | 0.4 | |
| 30 days | 1.3 | 1.2 | |
| HCl Immersion, Percent wt. increase: | | | |
| 1 day | 0.1 | 0.6 | |
| 7 days | 0.5 | 1.8 | |
| 30 days | 0.9 | 3.1 | |

The Brookfield viscosity (using Brookfield Viscometer) of the above casting Formulations A, B and C was measured at a temperature of 25° C. immediately after mixing. A series of castings was made with these formulations. These castings were allowed to harden at room temperature (25° C.) for 24 hours and then were post-cured by heating at 100° C. for 3 hours.

After the castings were cured they were tested to determine their heat distortion temperature (according to the ASTM method No. 684–56) and then were subjected to the following chemical resistance tests: (1) immersion in acetone for 1, 7 and 30 days, immersion in toluene for 1, 7 and 30 days, immersion in 10% acetic acid for 1, 7 and 30 days, immersion in water for 1, 7 and 30 days, immersion in 30% HCl for 1, 7 and 30 days. The percent increase in weight was determined in each case. The results of these measurements and tests are listed in Table I.

It is apparent from the above data that Formulation B containing the polyamide alone had an extremely high viscosity which was reduced approximately 4 fold by the addition of the dimethylaminoethanol (Formulation A). The data also show the remarkable increase in the heat distortion temperature over that obtained with the use of either the polyamide alone (Formulation B) or dimethylaminoethanol alone (Formulation C) as curing agents. Finally, note the marked increase in chemical resistance in Formulation A, particularly in organic solvents and acids obtained by the combination of the tertiary amino alcohol and the polyamide as compared to Formulations B and C where these materials are used alone.

In addition to the above tests, Formulations A and B were tested for hardness initially and after immersion for 168 hours in water and in acetone (using a Barcol hardness tester); for flexural modulus (using ASTM method D790–49T). The flexural modulus was taken initially, after 168 hours immersion in water and in acetone. Finally, castings made from Formulations A and B were tested for tensile strength (ASTM method D638–56T); compression strength (lbs./in.$^2$ deformation point) using ASTM method D695–54; and for impact strength (MIL I–16923 B) by dropping a steel ball three feet on a specimen $2'' \times 2'' \times \frac{1}{2}''$ until fracture occurs. The results of these tests are listed in Table II.

*Table II*

|  | Casting Form A | Casting Form B |
|---|---|---|
| Barcol Hardness: | | |
| Initial | 30 | 21. |
| After 168 hours in water | 26 | 13. |
| After 168 hours in acetone | 26 | 0. |
| Flexural Modulus: | | |
| Initial | 4.4×10$^5$ | 3.4×10$^5$. |
| After 168 hours in water | 4.1×10$^5$ | 2.6×10$^5$. |
| After 168 hours in acetone | 4.4×10$^5$ | 0.7×10$^5$. |
| Tensile Strength | 7,980 | 7,970. |
| Compression Strength | 14,000 | 12,500. |
| Impact Strength | No Failure of Either Specimen at Maximum of Test: 9.4 lb. steel Ball Falling 3 Ft. | |

It will be noted from the above data that the use of the mixture of tertiary amino alcohol and polyamide produced a marked increase in hardness without loss of the relatively high flexural and impact strength characteristic of epoxy resins cured with polyamides.

EXAMPLE II

Casting Formulations D, E and F were prepared as follows:

|  | Casting Form D | Casting Form E | Casting Form F |
|---|---|---|---|
| Epoxy Ether Resin A | 100 | 100 | 65 |
| Dimethylaminoethanol | 4 | 5.6 | |
| Polyamide A | 4 | 2.4 | 35 |

The Brookfield viscosity (centipoises) at 25° C. was measured for each formulation. Castings were then prepared of each formulation and allowed to stand for 24 hours at 25° C. and within post cured for 3 hours at 100° C. The castings were then tested for heat distortion temperature (ASTM method D648–56) The results of these measurements and tests are listed in Table III below:

*Table III*

|  | Formulation D | Formulation E | Formulation F |
|---|---|---|---|
| Brookfield Viscosity (centipoises) | 4,300 | 2,200 | 20,000 |
| Heat Distortion Temp., °C | 110 | 97 | 80 |

The above data show the same dramatic viscosity reduction brought about by the use of the tertiary amino alcohol and show the low viscosities obtainable with the use of increased amounts of dimethylaminoethanol. The same marked increase in heat distortion temperature is also shown by these data.

EXAMPLE III

Casting Formulations G to M inclusive were prepared as follows:

|  | G | H | I | J | K | L | M |
|---|---|---|---|---|---|---|---|
| Epoxy Ether Resin A | 100 | 165 | 100 | 100 | 100 | 100 | 100 |
| Dimethylaminoethanol | 3 | | | | | | |
| Polyamide A | 7 | 35 | 7 | 7 | 7 | 7 | 7 |
| Monoethanolamine | | | 3 | | | | |
| Diethanolamine | | | | 3 | | | |
| Triethanolamine | | | | | 3 | | |
| Ethylaminoethanol | | | | | | 3 | |
| Dibutylaminoethanol | | | | | | | 3 |

These formulations were examined to determine the compatibility of the curing agent with the resin. Castings were prepared from each formulation, allowed to stand at 25° C. for 24 hours and then post-cured at 100° C. for 3 hours. Using (ASTM D648–56) the heat distortion temperatures of the castings were measured. The results are listed in Table IV.

Table IV

|  | G | H | I | J | K | L | M |
|---|---|---|---|---|---|---|---|
| Compatibility of curing Agent With Resin | Yes | Yes | No | No | No | Yes | Yes |
| Heat Distortion Temp., °C | 110 | 80 | 45 | 40 | 30 | No cure | 42 |

The above data show that the synergistic results obtained with the specific tertiary monohydroxyamino alcohols used in accordance with the invention are not obtained with other amino alcohols even those having a close structural relationship. In each case results markedly inferior than those with the polyamide alone were obtained. Thus, the amino alcohols monoethanolamine, diethanolamine, and triethanolamine showed poor compatibility in the system, produced no cure of the resin at room temperature after 24 hours and when post-cured the resin had poor heat distortion temperature characteristics, far below those obtained with the polyamide alone. Alcohols such as ethylaminoethanol $$(C_2H_5)NH—C_2H_5OH$$

and dibutylaminoethanol $(C_4H_9)_2N—C_2H_5OH$ while compatible with the system likewise did not gel the resin at room temperature (ethylaminoethanol produced no cure even at 100° C.) and on post-curing showed low or unmeasurable heat distortion temperatures.

The curing agents of the invention are also advantageous for use in epoxy ether resin systems to be employed for producing thin protective coatings usually applied by spraying, brushing, dipping, flow coating or troweling where the curing of the resin is intended to take place at substantially ambient temperatures. For such applications, epoxy ether resins of moderately high molecular weight, particularly the polyglycidyl polyethers of dihydric phenols, especially the polyglycidyl polyethers of alkylene bisphenols (such as condensation products of epichlorhydrin and 2,2-bis(4-hydroxyphenyl) propane having average molecular weights ranging from 350 to 9000 are commonly employed and preferred in the practice of the invention. The resin may be dissolved in organic solvent, ketone solvents such as acetone, methylethyl ketone, methylisobutyl ketone, diacetone alcohol, cyclohexanone etc. being generally employed. Solvents such as xylene or toluene may also be employed. Various dyes, pigments, viscosity control agents and the like are commonly included in these formulations. The curing agents of the invention, when used in such formulations, provide the important advantages of somewhat faster drying time and increased chemical resistance of the coating. The following examples illustrate the invention as applied to the production of thin protective coatings.

EXAMPLE V

An epoxy ether resin solution coating formulation, designated as Coating Formulation A was prepared as follows:

| | Parts by weight |
|---|---|
| Epoxy ether resin B | 99 |
| Silicone resin | 1 |
| Methylisobutylketone | 45 |
| Ethylene glycol monobutyl ether | 5 |
| Toluene | 50 |

Epoxy ether resin B is an epoxy ether resin prepared by reacting 2,2-bis(4-hydroxyphenyl) propane with epichlorhydrin. It has an average molecular weight of approximately 1000, a softening point of approximately 70° C. (by Durrans' Mercury Method), a specific gravity of approximately 1.20, and an epoxy equivalency of 1.8. It may be prepared for example according to the procedure described for the preparation of "polyether C" in U.S. Patent 2,643,239. The silicone resin is an air drying organic siloxane used for the purpose of flow control.

Using Coating Formulation A, 8 batches were made up, designated as Formulations A-1 to A-5 respectively as follows:

| | A-1 | A-2 | A-3 | A-4 | A-5 |
|---|---|---|---|---|---|
| Coating Formulation A, parts by weight | 120 | 120 | 120 | 120 | 120 |
| Polyamide B solution parts by weight | 80 | 40 | 40 | | |
| Dimethylaminoethanol, parts by weight | | 2.5 | | 5.0 | |
| Diethylaminoethanol parts by weight | | | 2.5 | | 5.0 |

The Polyamide B solution is a solution containing 25% by weight of isopropanol, 25% by weight of toluene and 50% by weight of "Polyamide B" comprising a resinous polyamide obtained by condensation of dimerized and trimerized unsaturated fatty acids (mostly linoleic) from vegetable oils with diethylene triamine to produce a resin liquid at normal temperatures having an amine number of about 220, a Gardner color NDT 12, a viscosity at 104° F. of 500 to 750 poises (Brookfield Viscometer—#6 spindle, 4 r.p.m.), containing 0.05% by weight ash and having a specific gravity of 0.99.

Using each of the above formulations, A-1 to A-5, coatings were prepared on glass plates and metal plates by flow coating and on glass tubes by dipping the closed end and inverting. These coatings were cured for 24 hours at 75° F. and at relative humidity from 30 to 50%. The coatings on the glass and metal plates were observed for drying time to a tack-free condition. The coated steel panels were subjected to a bending test using a ¼″ Mandrel after 48 hours cure.

The coatings on the glass tubes were tested for chemical resistance by immersion of the coated ends of the tube into (a) distilled water, (b) 10% HCl, (c) 10% NaOH, and (d) methylisobutyl ketone for 24 hours at 75° F. Each set of coatings was rated on chemical resistance by assigning the numbers 1 to 5 in each particular test, the number 1 designating the coatings showing the maximum resistance, number 2 the coatings which show the next best resistance etc. after exposure to the particular reagent. In the case of a tie the same number was assigned. The ratings were made by observing the degree of discoloration of the initially clear film, such as whitening, yellowing or other forms of discoloration; the incidence of wrinkling, blistering and the like, by film softness and the area thus effected.

The results of the above tests are shown in Table V.

Table V

| | A-1 | A-2 | A-3 | A-4 | A-5 |
|---|---|---|---|---|---|
| Drying time to tack-free condition—hours | 12 | 9 | 18 | 12 | 24+ |
| Mandrel bend | (1) | (1) | (1) | (2) | (2) |
| Chemical Resisting Ratings: | | | | | |
| Distilled H₂O | 2 | 1 | 3 | 4 | 5 |
| 10% HCl | 4 | 2 | 2 | 1 | 5 |
| 10% NaOH | 3 | 1 | 1 | 3 | 5 |
| Methylisobutyl ketone | 1 | 1 | 1 | 4 | 5 |
| Total Chemical Resistance Rating | 10 | 5 | 7 | 12 | 20 |

[1] O.K.
[2] Cracking.

As may be seen from the data in Table V the chemical resistance obtained by the use of dimethylaminoethanol and diethylaminoethanol in combination with the polyamide is considerably improved over that obtained by the use of either the polyamide or the tertiary amino alcohol alone. The dimethylaminoethanol polyamide combination has the added advantage that it produces somewhat faster drying than the use of the polyamide alone.

EXAMPLE VI

Using Coating Formulation A three batches were made up designated as Formulation A-6, A-7 and A-8 as follows:

|  | A-6 | A-7 | A-8 |
|---|---|---|---|
| Coating Formulation A, parts by weight | 120 | 120 | 120 |
| Polyamide B solution, parts by weight | 80 | 80 | 80 |
| Dimethylaminoethanol |  | 2.5 |  |
| Diethylaminoethanol |  |  | 2.5 |

Coatings on glass tubes and metal plates using each of the above Formulations A-6 to A-8 were prepared as described in Example VI. These coatings were cured at from 75 to 90° F. at 25 to 30% relative humidity. The coatings on the glass and metal plates were observed for drying time for a tack-free condition and for the length of time required for the coating to achieve finger-nail hardness (i.e. not scratched by finger nail). The coatings on the glass tubes were tested for chemical resistance as in Example VI.

The results of these tests are listed in Table VI.

Table VI

|  | A-6 | A-7 | A-8 |
|---|---|---|---|
| Drying time to tack-free condition—hours | 9 | 8 | 12 |
| Drying time to fingernail hardness | 48 | 30 | 36 |
| Chemical Resistance ratings: |  |  |  |
| Distilled H₂O | 3 | 1 | 3 |
| 10% HCl | 3 | 1 | 1 |
| 10% NaOH | 1 | 2 | 3 |
| Methylisobutyl ketone | 4 | 1 | 1 |
| Total Chemical Resistance Rating | 11 | 5 | 8 |

As may be seen, the chemical resistance of the coatings prepared from systems containing the polyamide plus dimethylaminoethanol or diethylaminoethanol were superior to those cured with the polyamide alone or with diethylenetriamine alone. The dimethylaminoethanol system has the added advantage of faster drying and hardening time.

EXAMPLE VII

Another advantageous application of the present invention is in so called trowel coating compositions in which an epoxy ether resin is mixed with a relatively high proportion of an inorganic filler such as sand or the like, and this composition then troweled or otherwise applied to a surface as a coating having thicknesses ranging usually of the order of from 1/16 to 1/4″. By using the non-toxic curing agents of the invention, the advantages of greatly reduced viscosity of the filler resin mix and markedly increased gloss and smoothness of the surface of the cured composition are obtained. A typical filled resin composition suitable for this use is as follows:

| | |
|---|---|
| Epoxy ether resin A (as in Example I) | 42.5 |
| Filler (sand, quartz and clay) | 248.0 |
| Polyamide A (as in Example I) | 20.0 |
| Dimethylaminoethanol | 2.5 |
| Xylene | 5.5 |
| Amyl acetate | 6.0 |

We claim:

1. A composition comprising an epoxy ether resin having a 1,2-epoxy equivalency greater than 1 and a curing agent comprising a mixture of (a) a resinous polyamide obtained by the condensation of polymeric fat acids with an aliphatic polyamine, said resinous polyamide containing free functional groups selected from the class consisting of free amine groups and free carboxyl groups (b) a tertiary amino alcohol of the general formula

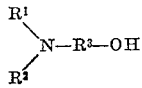

where $R^1$ and $R^2$ are selected from the group consisting of methyl and ethyl radicals, and $R^3$ is an alkylene radical having from 2 to 3 carbon atoms.

2. A composition in accordance with claim 1 in which said curing agent comprises a mixture of said resinous polyamide with a tertiary amino alcohol selected from the group consisting of dimethylaminoethanol, diethylaminoethanol, and mixtures thereof.

3. A composition comprising an epoxy ether resin having a 1,2-epoxy equivalency greater than 1 and a curing agent comprising a mixture of (a) a resinous polyamide obtained by the condensation of polymeric fat acids with an aliphtic polyamine, said resinous polyamide containing free functional groups selected from the class consisting of free amine groups and free carboxyl groups (b) a tertiary amino alcohol selected from the group consisting of dimethylaminoethanol, diethylaminoethanol, and mixtures thereof, the weight ratio of said tertiary amino alcohol to said resinous polyamide being in the range of from 1:19 to 9:1.

4. A composition in accordance with claim 1 in which said curing agent comprises a mixture of said resinous polyamide and dimethylaminoethanol.

5. A composition comprising an epoxy ether resin having a 1,2-epoxy equivalency greater than 1 and a curing agent comprising a mixture of (a) a resinous polyamide obtained by the condensation of polymeric fat acids with an aliphatic polyamine, said resinous polyamide containing free amine groups (b) a tertiary amino alcohol of the general formula

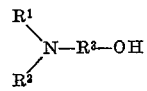

where $R^1$ and $R^2$ are selected from the group consisting of methyl and ethyl radicals, and $R^3$ is an alkylene radical having from 2 to 3 carbon atoms.

6. A composition in accordance with claim 5 in which said curing agent comprises a mixture of said resinous polyamide and a tertiary amino alcohol selected from the group consisting of dimethylaminoethanol, diethylaminoethanol, and mixtures thereof.

7. A composition in accordance with claim 6 in which said tertiary amino alcohol consists of dimethylaminoethanol.

8. A resin composition suitable for casting, molding and the like, comprising an epoxy ether resin having a 1,2-epoxy equivalency greater than 1 and a curing agent comprising a mixture of (a) a resinous polyamide obtained by the condensation of polymeric fat acids with an aliphatic polyamine, said resinous polyamide containing free amine groups (b) a tertiary amino alcohol selected from the group consisting of dimethylaminoethanol, diethylaminoethanol and mixtures thereof, the weight ratio of said tertiary amino alcohol to said resinous polyamide being in the range of from 1:5 to 7:3.

9. A coating composition comprising an epoxy ether resin having a 1,2-epoxy equivalency greater than 1 and a curing agent comprising a mixture of (a) a resinous polyamide obtained by the condensation of polymeric fat acids with an aliphatic polyamine, said resinous polyamide containing free amine groups (b) a tertiary amino alcohol selected from the class consisting of dimethylaminoethanol, diethylaminoethanol and mixtures thereof, the weight ratio of said tertiary amino alcohol to said resinous polyamide being in the range of from 1:19 to 1:2.

10. A composition comprising an epoxy ether resin having a 1,2-epoxy equivalency greater than 1 and consisting of polyglycidyl polyethers of dihydric phenols and a curing agent comprising a mixture of (a) a resinous polyamide obtained by the condensation of polymeric fat acids with an aliphatic polyamine, said resinous polyamide containing free amine groups (b) a tertiary amino alcohol selected from the group consisting of dimethylaminoethanol, diethylaminoethanol and mixtures thereof, the weight ratio of said tertiary amino alcohol to said resinous polyamide being in the range of from 1:19 to 9:1.

11. A composition in accordance with claim 10 in which said tertiary amino alcohol is dimethylaminoethanol.

12. A composition comprising an epoxy ether resin having a 1,2-epoxy equivalency greater than 1 and consisting of polyglycidyl polyethers of dihydric phenols having molecular weights ranging from 350 to 9000, and a curing agent comprising a mixture of (a) a resinous polyamide obtained by the condensation of polymeric fat acids with an aliphatic polyamine, said resinous polyamide containing free amine groups (b) a tertiary amino alcohol selected from the group consisting of dimethylaminoethanol, diethylaminoethanol and mixtures thereof, the weight ratio of said tertiary amino alcohol to said resinous polyamide being in the range of from 1:19 to 9:1.

13. A composition in accordance with claim 12 in which said tertiary amino alcohol is dimethylaminoethanol.

14. A composition comprising an epoxy ether resin having a 1,2-epoxy equivalency greater than 1 and a curing agent comprising a mixture of (a) a resinous polyamide, liquid at normal temperatures, obtained by the condensation of polymeric fat acids with an aliphatic polyamine, said resinous polyamide containing free amine groups and (b) a tertiary amino alcohol selected from the group consisting of dimethylaminoethanol, diethylaminoethanol, and mixtures thereof, the weight ratio of said tertiary amino alcohol to said resinous polyamide being in the range of from 1:19 to 9:1.

15. A composition in accordance with claim 14 in which said tertiary amino alcohol is dimethylaminoethanol.

16. A curing agent for epoxy ether resins having a 1,2-epoxy equivalency greater than 1 comprising a mixture of (a) a resinous polyamide obtained by the condensation of polymeric fat acids with an aliphatic polyamine, said resinous polyamide containing free functional groups selected from the class consisting of free amine groups and free carboxyl groups obtained by the condensation of polymeric fat acids with an aliphatic polyamine and (b) a tertiary amino alcohol of the general formula

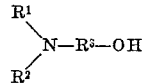

where $R^1$ and $R^2$ are selected from the group consisting of methyl and ethyl radicals, and $R^3$ is an alkylene radical having from 2 to 3 carbon atoms.

17. A curing agent for epoxy ether resins having a 1,2-epoxy equivalency greater than 1 comprising a mixture of (a) a resinous polyamide obtained by the condensation of polymeric fat acids with an aliphatic polyamine, said resinous polyamide containing free amine groups obtained by the condensation of polymeric fat acids with an aliphatic polyamide and (b) a tertiary amino alcohol selected from the group consisting of dimethylaminoethanol, diethylaminoethanol and mixtures thereof, the weight ratio of said tertiary amino alcohol to said resinous polyamide being in the range of from 1:19 to 9:1.

18. A curing agent in accordance with claim 17 in which said tertiary amino alcohol is dimethylaminoethanol.

References Cited in the file of this patent

UNITED STATES PATENTS 2,695,894　D'Alelio _____ Nov. 30, 1954

OTHER REFERENCES

Rouse et al.: "Curing Agents for Epoxy Resins"; Paint, Oil & Chemical Review; Nov. 5, 1953; pages 72–80.